May 7, 1957  J. H. NICHOLAS  2,791,622
CABLE TERMINATOR OR BUSHING
Filed Oct. 3, 1955  2 Sheets-Sheet 1
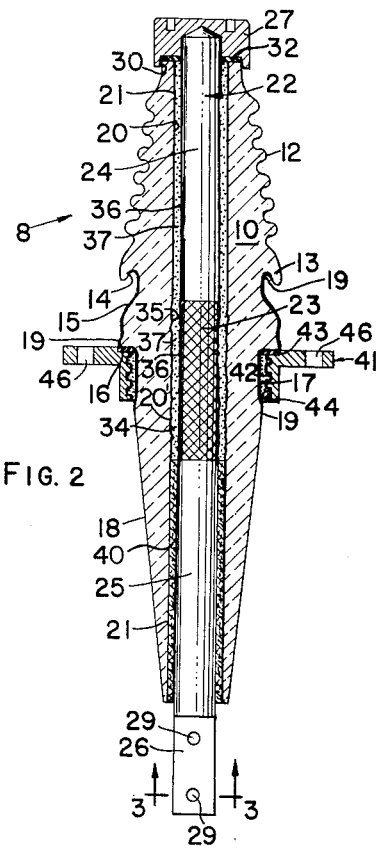
FIG. 2
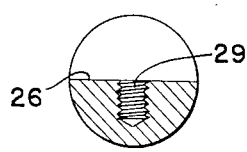
FIG. 3
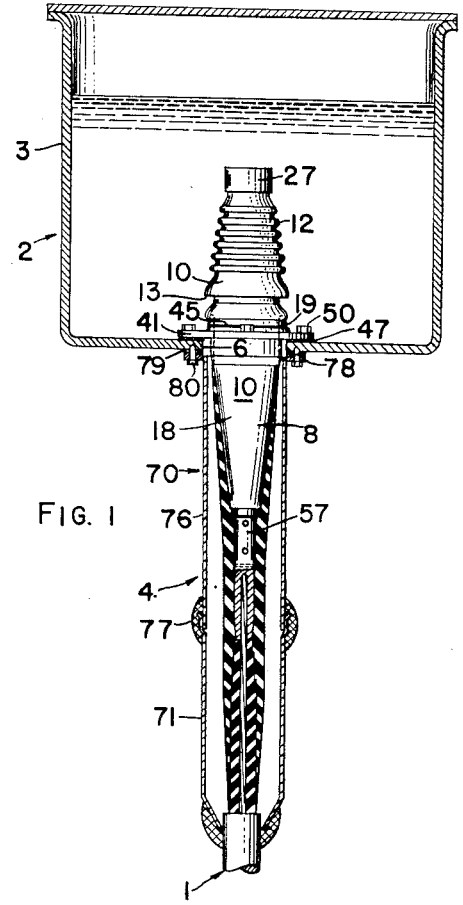
FIG. 1
*INVENTOR.*
JAMES H. NICHOLAS
ATTORNEY May 7, 1957   J. H. NICHOLAS   2,791,622
CABLE TERMINATOR OR BUSHING
Filed Oct. 3, 1955.   2 Sheets-Sheet 2

INVENTOR.
JAMES H. NICHOLAS
BY
ATTORNEY

2,791,622

CABLE TERMINATOR OR BUSHING

James H. Nicholas, Chicago, Ill., assignor to G & W Electric Specialty Company, Chicago, Ill., a corporation of Illinois Application October 3, 1955, Serial No. 538,103

3 Claims. (Cl. 174—20)

This invention relates to a high voltage cable joint, and more particularly to a stop joint between a high voltage cable and a switch element, transformer, or other element contained within an insulating-fluid-filled casing.

It is an object of this invention to provide a stop joint which utilizes a porcelain insulator through which a connector extends which joins a cable conductor on one side of the stop joint with a conductive part or member on the other side thereof and, further, wherein hand-wrapped and shielded insulation is applied around the insulator and cable end in a manner which insures reliability and maximum resistance to voltage breakdown.

These and other objects of the invention will become more apparent upon making reference to the specification to follow, taken in conjunction with the drawings showing an exemplary embodiment of the invention.

In the drawings:

Fig. 1 is a longitudinal section through the stop joint of the invention;

Fig. 2 is a longitudinal section through the insulator assembly forming part of the stop joint in Fig. 1;

Fig. 3 is an enlarged transverse section through a portion of the connector of the insulator assembly, taken along section line 3—3 in Fig. 2.

Refer now to the drawings wherein like reference numerals indicate like parts throughout.

Figure 4:
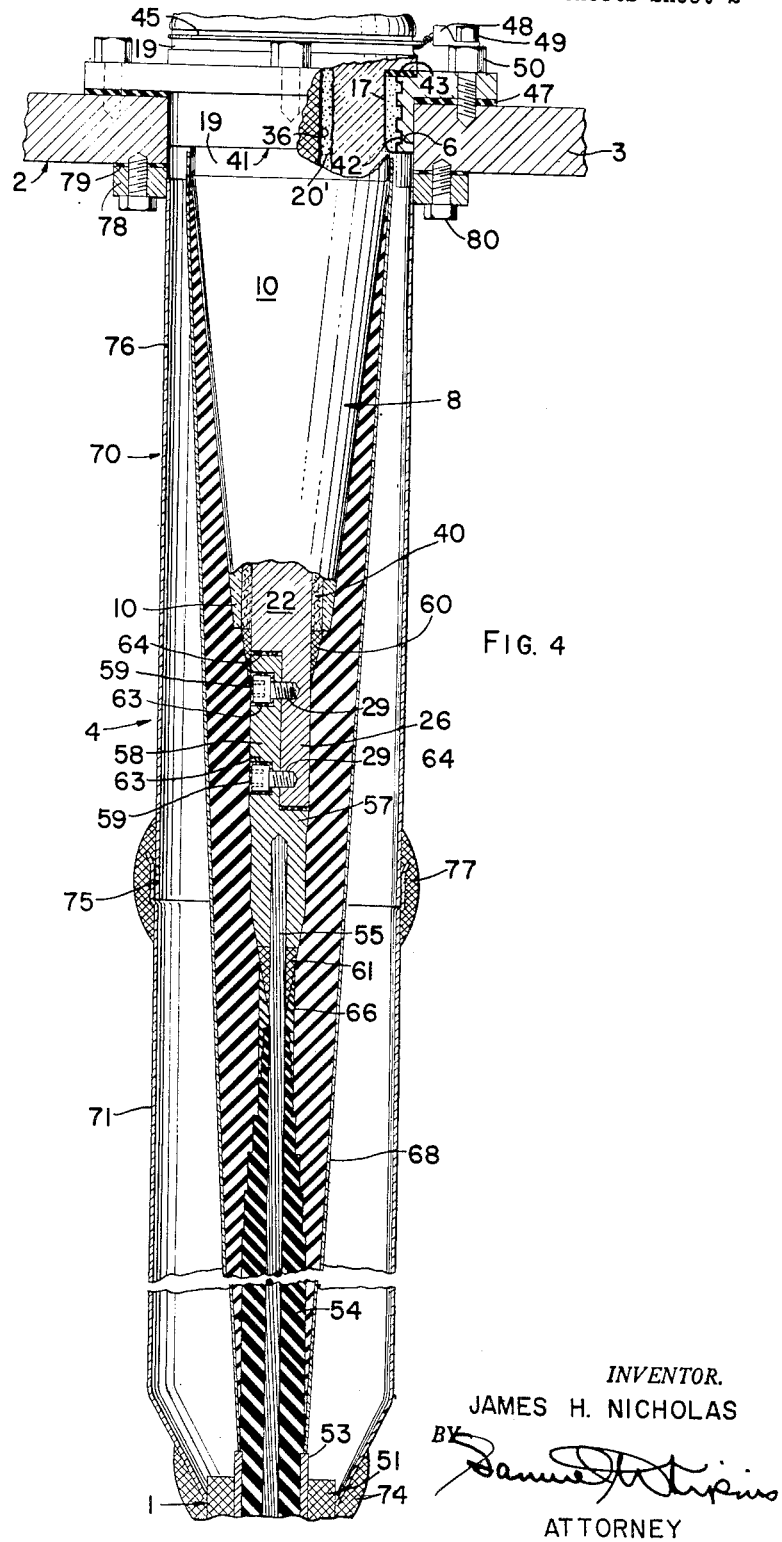
Fig. 4 is an enlarged fragmentary longitudinal section through a part of the stop joint of Fig. 1.

In the drawings, the reference numeral 1 generally indicates a high voltage cable and reference numeral 2 generally indicates a high voltage apparatus to which the cable is to be connected. The apparatus 2 includes an oil filled metal casing 3 which may contain a high voltage switch or the like (not shown). It should be understood, however, that the apparatus 2 could be replaced, for example, by a porcelain terminator structure where connections are made to an overhead cable. The invention pertains to the stop joint structure generally indicated by the reference numeral 4 by means of which the cable 1 may be electrically connected through a fluid-tight seal or seals with the conductive elements within the casing 3 or other apparatus.

The oil filled casing 3 is provided with an opening 6 in the bottom thereof through which extends a stud insulator bushing assembly 8 forming part of the stop joint structure of the invention. The insulator bushing assembly 8 includes a porcelain insulator bushing 10 having oppositely tapering ends. The upper end of the bushing has insulating skirts 12, the bottommost insulating skirt 13 of which is shaped to provide an annular recess 14 within the insulator body. Proceeding downward from this recess 14, the insulator bushing first bulges outward at 15 whereupon the cross section suddenly decreases providing a downwardly, axially facing shoulder 16 and a cylindrical neck portion 17 terminating in a tapered end portion 18 which gradually decreases in diameter from the neck portion 17 to the bottom of the insulator bushing.

For reasons to be explained, the outer surface of the bushing insulator is initially glazed at 19 from the outer terminus of the bushing recess 14 to an area a small distance below the cylindrical neck portion 17 thereof. The glazing is subsequently removed from the shoulder 16 when the latter is ground flat to provide a smooth surface to be sealed against the gasket 43.

A longitudinal cylindrical through-bore 20 is formed in the insulator bushing and the bore walls are glazed with a conductive coating 21. An intermediate portion of the bore is roughened at 20'. A generally cylindrical connector rod 22 passes through the insulator bore 20 and it has a knurled intermediate portion 23 opposite the roughened bore portion 20' and smooth surfaced upper and lower portions 24 and 25 on opposite sides thereof.

The bottom end of the cylindrical connector rod 22 below the bushing insulator 10 is flat or semi-cylindrical at 26 and a pair of threaded bores 29 are formed through this portion of the connector.

Fixedly secured to the upper end of the connector rod 22 is a force-applying cap 27 which overlies the flat upper end of the insulator bushing 10. The cap 27 has a circular recess 30 formed therein which receives the reduced upper end of the insulator bushing. Sandwiched between the upper end of the insulator bushing and the upper defining wall of the cap recess 30 is a gasket 32. The gasket 32 is maintained under compression between the cap 27 and the top of the insulator bushing in a manner to be explained, so that a fluid-tight seal is maintained over the limits of relative thermal expansion and contraction of the bushing insulator and connector rod.

The force of the cap 27 against the gasket 32 is obtained by holding the connector rod 22 under tension by an adhesive bond 34 between the connector rod and the insulator bushing. This adhesive bond is formed between the knurled portion 23 of the connector rod and a roughened portion 35 of the inner bushing insulator wall. The adhesive bond includes a layer 36 of a material which does not adhere well to the connector, such as glyptol, which material is applied to the knurled portion of the connector. The space left between the glyptol layer and the roughened portion 35 of the bushing insulator is filled with a cement 37, preferably porcelain, magnesium chloride or lumnite cement. The latter cements are, for the most part, relatively rigid or inflexible materials which, when hardened, are capable of maintaining a tenacious bond with the porcelain insulator bushing 12 and with the glyptol layer. Glyptol, on the other hand, is sufficiently compressible that it gives under the expected range of relative axial expansion and contraction of the knurled portion of the connector and the insulator 10.

The glyptol layer 36 also extends along the connector from the knurled portion thereof up to the upper capped end thereof. Due to the smooth surface of the latter portion of the connector and the characteristics of glyptol, the glyptol layer does not become intimately bonded with the latter portion of the connector so that relative longitudinal movement is permitted between the latter portion of the connector and the glyptol layer surrounding it. The space between the last-mentioned portion of the glyptol layer and the glazed walls of the bushing bore are filled with the same cement 37 previously mentioned.

The space between the lower portion 25 of the connector and the bottom tapered end 18 of the bushing insulator is packed with copper or lead wool 40 which maintains conductor potential on the inside of the insulator bushing to prevent breakdown stresses from occurring within the bushing.

A mounting flange 41 for securing the stud bushing assembly 8 within the opening 6 of the casing 3 is secured around the insulator bushing neck portion 17. A gasket 43 is maintained under compression between the mounting flange 41 and the annular shoulder 16 of the bushing insulator. The gasket 43 is maintained under compression by cementing the mounting flange to the insulator bushing neck while the flange is held against the gasket. The bond between the mounting flange and the insulator bushing comprises a coating of glyptol paint 42 applied to serrated or notched inner walls 44 thereof defining a central through-bore in the mounting flange. The porcelain, magnesium chloride or lumnite cement fills the space between the glyptol coating and the conductive glaze 19 on the insulator bushing neck. The amount of compression of the gasket 43 is such that the gasket will be compressed sufficiently to maintain a fluid-tight seal over the limits of expected relative thermal expansion and contraction of the mounting flange and the bushing insulator.

Thus, the compressed gaskets 43 and 32 respectively prevent entry of insulating fluid between the connector and insulator bushing on the one hand and the mounting flange 41 and the insulator bushing on the other hand.

The stud insulator bushing assembly 8 is mounted within the casing opening 6 with a gasket 47 interposed between the mounting flange 41 and the casing bottom. The gasket 47 is maintained under compression to provide a fluid-tight seal between the mounting flange and casing by any suitable means, such as by screws 50 passing through holes 46 in the mounting flange and threading into the casing bottom.

In some cases, it has been found necessary to grind away a portion of the surface of the insulator bushing 10 to form the gasket-receiving shoulders 16. In so doing, a part of the conductive glazing 19 is removed resulting in a discontinuity along the length of the glazing. To reduce breakdown electric stresses, it is important to provide ground potential over the portions of the insulator adjacent to the mounting flange 41. Provision is made for grounding the glazing above the shoulder 16 which includes a conductive wire 45 wrapped around the insulator bushing just above the mounting flange 41. The wire 45 is connected to a lug 48 which in turn is connected to ground potential through a screw 49 threading into one of the screws 50 which maintains the gasket 47 under compression and threads into the usually grounded oil filled casing 3.

In preparing the cable 1 for installation, the cable sheathing 51 and the shielding braid 53 thereof (Fig. 4) are cut back from the end of the cable, and the exposed covering insulation 54 is tapered in a step fashion to a point behind the end of the twisted strand cable conductor 55 of the cable. The end of the twisted cable conductor 55 is placed within the socket of a compression ferrule 57 which has a semi-cylindrical portion 58 complementary in size and shape to the semi-cylindrical or flat end 26 of the bushing connector 22. The semi-cylindrical portion 58 of the compression ferrule is provided with counterbores for receiving the heads of screws 59—59 which thread into the tapped holes 29—29 in the connector and so connect the compression ferrule with the connector 22. Lead foil is applied and rolled smooth to form a tapered portion between the bottom end of the insulator bushing 10 and the assembly of the connector 22 and the compression ferrule 57. This tapered fairing is provided to insure a gradually sloping contour along the conducting surfaces of the stop joint. A similar tapered lead foil fairing is provided at 61 between the bottom end of the compression ferrule 57 and the exposed portion of the twisted cable conductor 55. The spaces left between the heads of the screws 59 and the surrounding counterbore walls, and the spaces between the connector and ferrule ends are filled with lead wool as at 63 and 64.

Hand wrapped insulation 66 is then applied around the bushing insulator 10, the bushing connector 22, compression ferrule 57 and cable end to provide a build up of insulation which gradually increases in diameter from the end of the cable shielding braid 53 to a point contiguous to the bottom rim of the mounting flange 41 of the bushing insulator assembly 8. For gas and oil filled cables, the hand wrapped insulation comprises a low loss, oil impregnated crepe paper taping. The taping is preferably initially applied to fill in the stepped area between the cable covering insulation and the compression ferrule 57. Each layer of tape is preferably laid level from a stepped edge of the covering insulation to the ferrule or connector surface. After this portion of the taping is complete, it is usually advisable to tape the first few layers along the entire length of the taping area. This will prevent undue slippage on the porcelain surface of the bushing insulator during the addition of the bulk of the tape.

When the cone of taping is completed, oil-packed metal tinsel braiding 68 is applied over the crepe paper taping. At one end the braiding 68 makes contact with the grounded shielding braid 53 of the cable 1. The braid 68 is preferably tack soldered to the cable shielding braid and adjacent turns of the tinsel braid is spot soldered, with preferably each adjacent turn tacked in approximately three places along its circumference to the adjacent turn.

The upper end of the tinsel braiding 68 overlaps the bottom end of the insulator bushing glazing 19 of the insulator bushing and thus grounds the lower portion of the glazing 19.

The portion of the joint below the oil filled casing 3 is surrounded by a casing assembly 70 including a metal casing part 71 having an inturned bottom end which is connected to the cable sheath 61 by a solder wipe joint 74. The upper end of the casing part 71 has a slightly enlarged portion 75 into which the bottom end of a casing part 76 extends. The casing parts are secured together by a wiped soldered joint 77. The upper end of the casing part 76 is provided with a flange 78 which is pressed in tight sealing relation against a sealing gasket 79 by screws 80.

The resultant stop joint of the invention is highly effective in minimizing electric stresses within the joint and in maintaining a fluid seal between sections of the joint.

It should be understood that numerous modifications may be made of the preferred embodiment of the invention above described without deviating from the broader aspects of the invention.

I claim:

1. A high voltage cable stop joint assembly comprising an insulator, said insulator having a longitudinal through-bore, a connector extending therethrough, axial force-applying means on said connector, a gasket compressed between said force-applying means and an axially facing surface of said insulator to form a fluid-tight seal between the connector and insulator, the compression of said gasket being such that the contemplated relative thermal expansion and contraction of the insulator and connector will not reduce the compression of said gasket below that required for maintaining a fluid-tight seal therebetween, the force applied against said gasket being maintained by a cement bond between said connector and insulator which holds the connector under tension, a high voltage cable having an inner cable conductor electrically and mechanically joined to one end of said connector and an outer conductive sheathing insulated from said conductor, a continuous wrapping of insulation around said insulator, connector and cable end, a grounded conductive shield closely enveloping said wrapped insulation along substantially its entire length, and a fluid-tight casing extending from said cable sheath and surrounding the contiguous end of said insulator.

2. A high voltage cable stop joint assembly comprising an insulator having a longitudinal through-bore, a connector extending therethrough, axial force-applying means on said connector, a gasket compressed between said force-applying means and an axially facing surface of said insulator to form a fluid-tight seal between the connector and insulator, the compression of said gasket being such that the contemplated relative thermal expansion and contraction of the insulator and connector will not reduce the compression of said gasket below that required for maintaining a fluid-tight seal therebetween, the force applied against said gasket being maintained by a cement bond between said connector and insulator which holds the connector under tension, an annular axially facing shoulder formed on the outer surface of said insulator, a gasket mounted against said shoulder, a mounting flange secured to the outer surface of said insulator by a cement bond, the flange compressing said second-mentioned gasket an amount which will provide a fluid-tight seal for the limits of the expected relative thermal expansion and contraction of said mounting flange and insulator, a high voltage cable having an inner cable conductor electrically and mechanically joined to one end of said connector and an outer conductive sheathing insulated from said conductor, a continuous wrapping of insulation around said insulator, connector and cable end, a grounded conductive shield closely enveloping said wrapped insulation along substantially its entire length, and a fluid-tight casing extending from said cable sheath and surrounding said insulator on one side of said mounting flange.

3. A high voltage cable stop joint assembly comprising an insulator, said insulator having at least one tapered end and a longitudinal through-bore which is roughened in an intermediate region thereof, a connector of smaller size than said bore extending therethrough, said connector being externally knurled opposite said roughened bore region, a force-applying projection on said connector, a gasket compressed between said projection and the end of said insulator opposite said one tapered end thereof and forming a fluid-tight seal between the connector and insulator, the compression of said gasket being such that the contemplated relative thermal expansion and contraction of the insulator and connector will not reduce the compression of said gasket below that required for maintaining a fluid-tight seal therebetween, the force of said projection against said gasket being maintained by a cement bond in the space between said roughened and knurled surfaces of said insulator and connector, respectively, which holds the connector under tension, said cement bond including a coating of resilient material applied to the knurling of said connector and capable of yielding to the forces imparted by the normal thermal expansion and contraction of the connector and a relatively non-yielding cement extending between said resilient coating and the walls of said insulator, at least the portion of said connector between said knurled portion thereof and said force-applying projection thereof being free to move longitudinally relative to the length of the insulator over the expected limits of relative thermal expansion therebetween, an annular axially facing shoulder formed on the outside of said insulator, a gasket mounted against said shoulder, a mounting flange secured to the outer surface of said insulator under tension by a cement bond, the flange compressing said second-mentioned gasket an amount which will provide a fluid-tight seal for the limits of expected relative thermal expansion and contraction of said mounting flange and insulator, a high voltage cable having an inner cable conductor and an outer conductive sheathing insulated therefrom, a compression ferrule surrounding the end of the inner conductor of said cable and secured to the end of said insulator connector extending beyond said one tapered end thereof, a continuous wrapping of insulation around said one tapered end of said insulator, the connector and cable end, a grounded conductive shield closely enveloping said wrapped insulation along substantially its entire length, and a fluid-tight casing extending from said cable sheath and surrounding said insulator on one side of said mounting flange.

References Cited in the file of this patent

UNITED STATES PATENTS

| 2,000,748 | Engster | May 7, 1935 |
| 2,075,019 | Buch et al. | Mar. 30, 1937 |